US006954143B2

(12) United States Patent
Crook

(10) Patent No.: US 6,954,143 B2
(45) Date of Patent: Oct. 11, 2005

(54) MOBILE SYSTEM FOR RESPONDING TO HYDROGEN SULFIDE GAS AT A PLURALITY OF REMOTE WELL SITES

(76) Inventor: Gary W. Crook, 2516 Seabeard, Midland, TX (US) 79705

( * ) Notice: Subject to any disclaimer, the term of this patent is extended or adjusted under 35 U.S.C. 154(b) by 283 days.

(21) Appl. No.: 10/447,438

(22) Filed: May 29, 2003

(65) Prior Publication Data

US 2004/0239499 A1 Dec. 2, 2004

(51) Int. Cl.[7] .................... G08B 1/08; G01N 9/00
(52) U.S. Cl. .................... 340/539.26; 340/539.17; 340/539.18; 340/632; 73/23.2; 702/24
(58) Field of Search .................... 340/539.1, 539.22, 340/539.17, 531, 539.26, 539.18, 425.5, 870.01, 870.09, 870.16, 539.13, 870.03, 632–634; 73/23.2; 702/24

(56) References Cited

U.S. PATENT DOCUMENTS 5,311,197 A * 5/1994 Sorden et al. .............. 342/457
5,382,943 A * 1/1995 Tanaka .................. 340/539.22
5,568,121 A * 10/1996 Lamensdorf ........... 340/539.17
5,650,770 A * 7/1997 Schlager et al. ......... 340/573.1
5,969,623 A * 10/1999 Fleury et al. ............... 340/632
6,079,490 A 6/2000 Newman
6,252,510 B1 6/2001 Dungan
6,701,772 B2 * 3/2004 Kreichauf et al. ........... 73/23.2
6,785,619 B1 * 8/2004 Homann et al. .............. 702/51

* cited by examiner

*Primary Examiner*—Donnie L. Crosland
(74) *Attorney, Agent, or Firm*—Robert J. Harter

(57) ABSTRACT

A mobile system travels with a work crew to various remote well sites and monitors the presence of H2S (hydrogen sulfide gas) at those sites. If the concentration of H2S reaches a toxic level, the system notifies a distant host computer of not only the problem but also where the problem exists. Help can then be dispatched to the known area. In some embodiments, the system notifies the work crew when help is on the way.

23 Claims, 3 Drawing Sheets

MOBILE SYSTEM FOR RESPONDING TO HYDROGEN SULFIDE GAS AT A PLURALITY OF REMOTE WELL SITES

BACKGROUND OF THE INVENTION

1. Field of the Invention

The subject invention pertains to the hazards of hydrogen sulfide and more specifically to a system for responding to an excessive amount of hydrogen sulfide at a well site.

2. Description of Related Art

Hydrogen sulfide, H2S, is a toxic gas that often accompanies the production of gas, oil and water. H2S can usually be contained, but if it escapes, an H2S monitor can be used for alerting personnel in the area. In response to sensing about 10 to 20 ppm of H2S, typical H2S monitors will sound an alarm that warns of the danger. Once the alarm sounds, personnel often have sufficient time to vacate the area. In some cases, however, someone or everyone in the area may be overcome by the gas and fall to the ground. Since H2S is heavier than air, an unconscious person lying on the ground may continue breathing the toxic gas. If outside help is not quickly summoned to the area, eventually those continuing to breath the gas may die.

U.S. Pat. No. 6,252,510 discloses an H2S system that calls for outside help upon sensing an excessive amount of H2S at a distant location. The system appears to be designed for an established chemical plant where the H2S monitor is at a fixed, known location. Such a system may be fine for such an application because the location of the H2S monitor is known, thus the location where medical assistance is needed is also known.

However, in the case of an oilfield crew working among numerous remote oilfields, the location of the crew may be unknown to those that may otherwise be able to dispatch help to where it is needed. Thus, oilfield workers may be left stranded in an emergency and have to rely solely on their own ability to help themselves.

It is conceivable to install a dedicated H2S monitor at each and every oilfield; however, such an approach would be unnecessarily expensive because the vast majority of oilfields operate unattended. Often, an H2S monitor and an emergency call-out alarm is only needed when a work crew or other personnel are in the area.

Consequently, a need exists for an H2S monitor that can not only travel with a work crew but also communicate to outside help the location of the monitor.

SUMMARY OF THE INVENTION

To improve the safety of a work crew that travels among numerous oilfields, it is an object of some embodiments of the invention to provide an H2S monitor system that can travel with the crew and transmit to a designated host computer information that indicates the location of the crew.

In some embodiments, the H2S sensor is carried by a service rig or truck used by the work crew.

In some embodiments, the H2S system calls for help via a wireless communication link between the H2S monitor and the designated host computer.

In some embodiments, the host computer is notified of an alarm or fault after the host computer first sends an inquiry signal to the H2S system.

In some embodiments, the H2S system provides an opportunity to deactivate an alarm within a certain time delay.

In some embodiments, the system communicates to a host computer the location of the H2S monitor using a global positioning system.

In some embodiments, the system communicates to a host computer the location of the H2S monitor using an LBS system.

In some embodiments, the system communicates to a host computer a fault in the H2S system.

In some embodiments, the H2S system employs an NDB transmitter that directs help to the area where the H2S monitor detected a high level of hydrogen sulfide gas.

In some embodiments, the H2S system provides a reassurance signal that informs a work crew that help is on the way.

One or more of these and other objects of the invention are provided by a mobile system for responding to hydrogen sulfide at a plurality of well sites that are remote relative to a host computer. In response to detecting an excessive concentration of hydrogen sulfide, the system communicates that information as well as the location of the problem to the host computer.

DESCRIPTION OF THE PREFERRED EMBODIMENT

Figure 1:
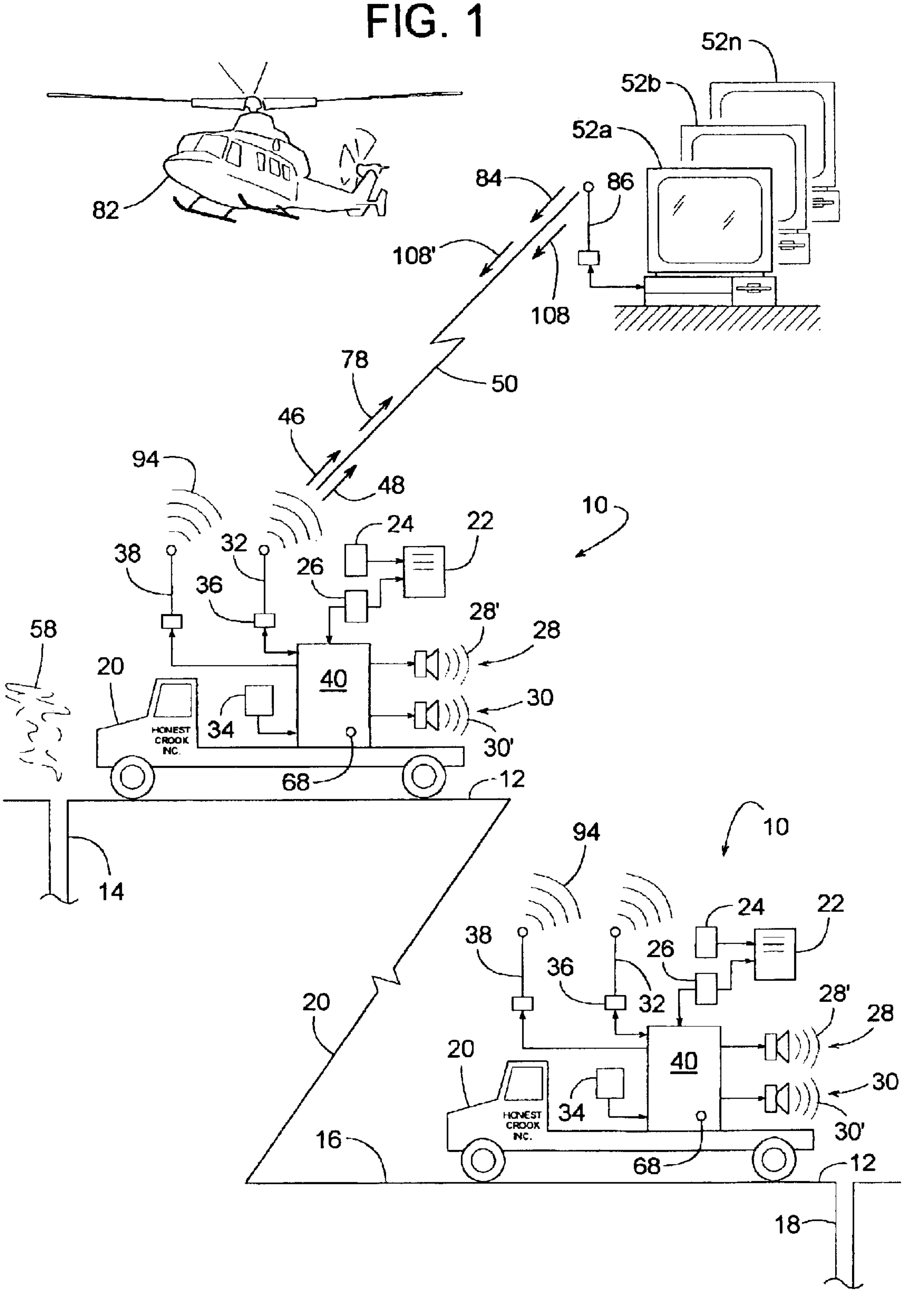
FIG. 1 is a schematic diagram of a mobile system for responding to a hazardous concentration of hydrogen sulfide gas.

FIG. 1 is a schematic diagram illustrating a mobile system 10 for responding to hydrogen sulfide gas detected at a plurality of well sites. The plurality of well sites may include, for example, a first well site 12 with a first well bore 14, and a second well site 16 with a second well bore 18. A broken line 20 indicates that well sites 12 and 16 are remote relative to each other, wherein the term, "remote" used herein and throughout refers to a distance of at least ten miles.

System 10 and its various components are made mobile by virtue of a truck 20 that carries a variety of equipment to the various well sites. A typically stationary H2S monitor, for instance, is considered a mobile H2S monitor because the monitor is carried by truck 20. The term, "truck" refers to any wheeled vehicle used to facilitate installing, disassembling, repairing, or otherwise servicing a well. A left-central area of FIG. 1 shows truck 20 at well site 12, and a lower-right area of FIG. 1 shows truck 20 at well site 16.

Mobile system 10 primarily pertains to the safety-related equipment on truck 20. In some cases, the safety-related equipment on truck 20 includes one or more of the following: a mobile hydrogen sulfide monitor 22, its primary power supply 24 and its backup power supply 26; a first alarm 28; a second alarm 30; a mobile transmitter 32, a GPS unit 34 (Global Positioning System); an LBS system 36 (Location-Based Services system); and a mobile NDB transmitter 38 (Non-Directional Radiobeacon).

Hydrogen sulfide monitor 22 is schematically illustrated to represent any device that provides an alarm in response to sensing that hydrogen sulfide gas has exceeded a predetermined limit. Such hydrogen sulfide monitors are well known to those skilled in the art.

Alarms 28 and 30 are schematically illustrated to represent a single-unit alarm or the alternate embodiment of two separate alarm units. In some embodiments, the single-unit can only generate a single alarm (audible or visible), and in other embodiments, the single-unit can selectively emit two or more distinguishable alarms (e.g., high pitch and low pitch).

A controller 40 coordinates and controls the operation and interaction of the safety-related equipment. Controller 40 is schematically illustrated to represent any appropriate logic processor. Examples of controller 40 include, but are not limited to, a personal computer, microprocessor, microcomputer, PC, desktop computer, laptop computer, notebook computer, handheld computer, portable computer, PDA device (e.g., a personal digital assistant, PLC (programmable logic controller), analog electrical circuit, digital electrical circuit, and various combinations thereof. Controller 40 may include appropriate I/O devices such as I/O boards, I/O modules, A/D converters, drivers, etc. Such devices are well known to those skilled in the art.

In operation, truck 20 may travel to well site 12 to service the well. While there, controller 40 controls the operation of the safety-related equipment according to some predetermined control algorithm. In some embodiments, for example, controller 40 operates according to the algorithm of FIG. 2.

Figure 2:
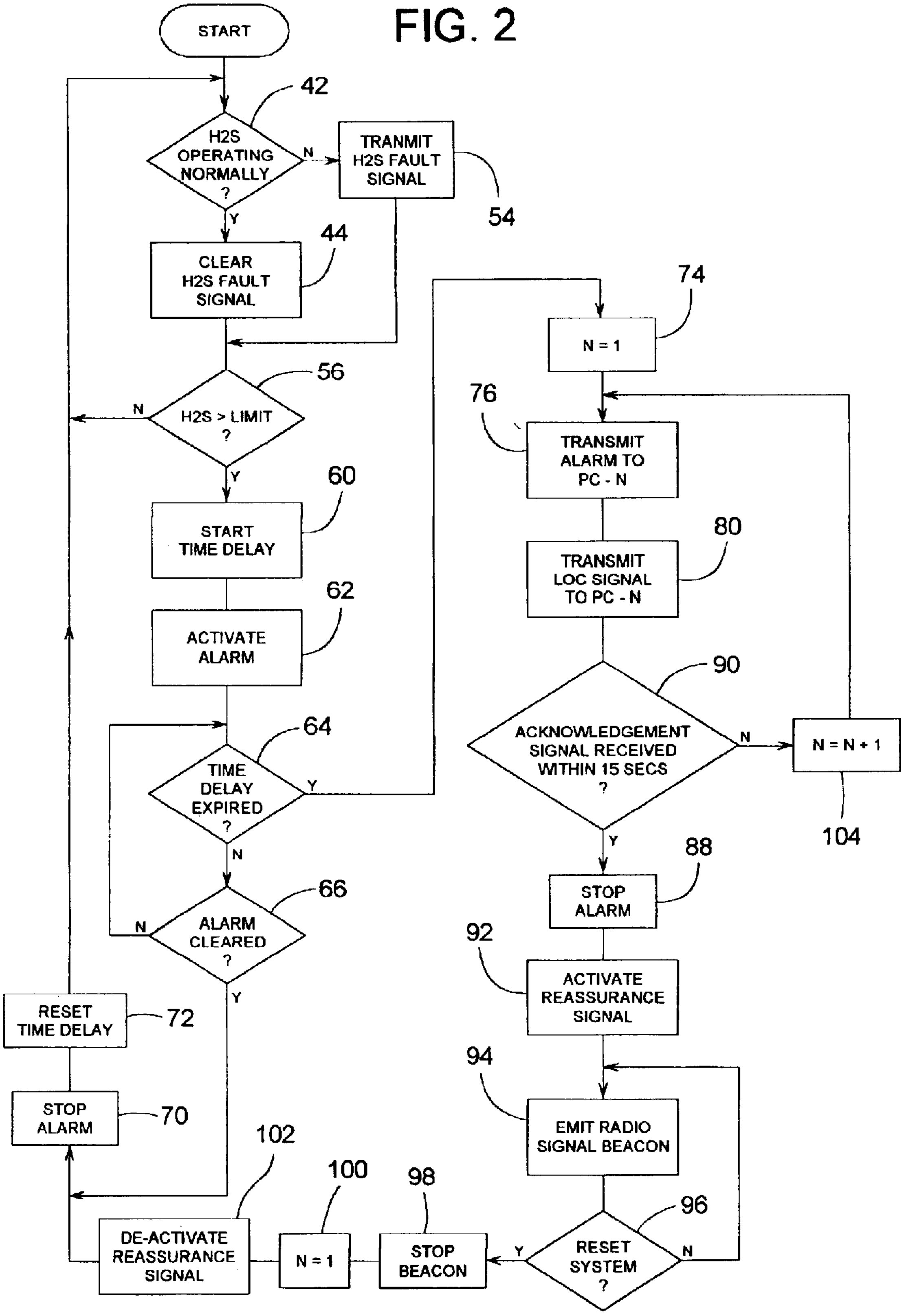
FIG. 2 is one example of an algorithm of a microcontroller that determines a system's response to a hazardous concentration of hydrogen sulfide gas.

In FIG. 2, decision block 42 first determines whether H2S monitor 22 is functioning properly or whether some monitor-related fault has occurred. The fault refers to a malfunction rather than a hydrogen sulfide triggered event. In some cases, for example, a current transformer in communication with controller 40 may determine that H2S monitor 22 has switched from its primary power supply 24 (e.g., the truck's main battery) over to backup power supply 26 (e.g., dedicated backup battery for monitor 22).

If a monitor-related fault occurs, control block 44 commands transmitter 32 to transmit an H2S fault signal 46 and a location signal 48 over a wireless communication link 50 to a remote designated host computer 52*a*, which could be at a central dispatch office or some other distant location. Knowing the location and nature of the problem, the dispatch office can respond accordingly. Transmitter 32 is schematically illustrated to represent any device for enabling the transmission and/or receiving of signals through air. Examples of transmitter 32 include, but are not limited to, a transceiver, antenna, parabolic dish, cellular phone, modem, etc.

Location signal 48 can be provided in various ways, such as by employing GPS unit 34 or LBS system 36. GPS unit 34 is a satellite-based system that identifies a location's global coordinates. LBS system 36 determines the location of transmitter 32 when transmitter 32 is part of a network of similar transmitters, as is the case with cellular phone technology. The LBS system employs triangulation of multiple transmitters to identify the location of a particular transmitter, such as transmitter 32. Both GPS and LBS systems are well known to those skilled in the art.

If a monitor-related fault does not exist, and H2S monitor 22 is functioning properly on its primary power supply 24, then control logic transfers to block 54, which clears or terminates H2S fault signal 46.

Next, the control logic transfers to decision block 56. In response to input from H2S monitor 22, decision block 56 determines whether H2S monitor 22 detects a concentration of hydrogen sulfide gas 58 that exceeds a predetermined, allowable limit. If the H2S level is below the limit, the control logic returns to decision block 42.

If, however, the concentration of H2S exceeds the allowable limit, block 60 initiates a time delay (e.g., 30 seconds, 60 seconds, two minutes, or whatever), and block 62 activates alarm 28. In some embodiments, the time delay of block 60 is a programmed value that could be set to any value greater than or equal to zero. Blocks 64 and 66 provide a limited opportunity for someone to abort the H2S alarm/call-out sequence. If someone resets or disables the process by actuating a reset switch 68 within the time delay defined by block 64, then block 70 deactivates alarm 28, block 72 resets and terminates the time delay, and the control logic returns to decision block 42.

If decision block 64 determines that the time delay has run its course without being reset, then the control logic transfers to block 74. Block 74 sets a counter-N to one, and block 76 commands transmitter 32 to transmit an alarm signal 78 over wireless communication link 50 to one or more host computers, such as host computer 52*a*. Likewise, block 80 commands transmitter 32 to transmit location signal 48 to host computer 52*a*, so the host computer is made aware that H2S monitor 22 was triggered at well site 12. In other words, someone beyond the well site knows that an H2S alarm was triggered and knows the location where it was triggered.

It should be noted that the communication of the alarm and its location to one or more host computers can be carried out using conventional wireless communication technology including, but not limited to, analog or digital cell phone, pager, Internet, etc.

If the information was successfully conveyed to host computer 52*a*, a person at computer 52*a* can dispatch a rescue team 82 (e.g., helicopter, ambulance, etc.) to well site 12 and send an acknowledgement signal 84 back to well site 12 via a transmitter 86 (or transceiver, etc.), communication link 50, and transmitter 32 (or an appropriate receiver or transceiver at well site 12). Once controller 40 receives acknowledgement signal 84 as determined by a decision block 90, a block 88 discontinues an alarm signal 28' and block 92 activates a reassurance signal 30'. Reassurance signal 30' is preferably an audible signal that can be differentiated from alarm signal 28'. Reassurance signal 30' notifies those at well site 12 that help is on the way.

To direct rescue team 82 to well site 12, block 94 may, in some embodiments, command transmitter 38 to emit an NBD signal 94. The rescue team, in turn, has a conventional ADF set (Automatic Direction Finder set) which points to the source of NDB signal 94, whereby the ADF and NDB system helps guide the rescue team to well site 12.

Once help has arrived, decision block 96 resets system 10, block 98 terminates the transmission of NDB signal 94, block 100 ensures counter-N is set to one, block 102 discontinues reassurance signal 30', block 70 ensures alarm 28 is turned off, block 72 ensures that the time delay is reset, and control returns to decision block 42.

Referring back to decision block 90, if the first host computer 52*a* fails to acknowledge alarm signal 78 within a predetermined reasonable time (e.g., 15 seconds), then block 104 increments counter-N, and blocks 76 and 80 transmit alarm signal 78 and location signal 48 to another designated host computer 52*b*. In some embodiments, the "predetermined reasonable time" specified in block 90 is a programmed value that could be set to any value greater than or equal to zero seconds. If the predetermined reasonable time is zero seconds, then all the host computers are notified of the problem simultaneously. The first host computer to respond could then notify the other host computers that the problem is being attended to. The first responding computer, for instance, could send a message over the Internet that notifies the other computers that the first responding computer has already responded to the alarm. If the predetermined reasonable time is greater than zero, then the incrementing of counter-N and sequential calling of other designated host computers 52*a* can continue until a host computer is successfully notified of the problem. When a host computer is reached, its response could be the same as just described with reference to host computer 52*a*.

The process just described is similar regardless of whether truck 20 is at well site 12 or 16. However, the location-related information will of course be different and unique for each well site.

Figure 3:
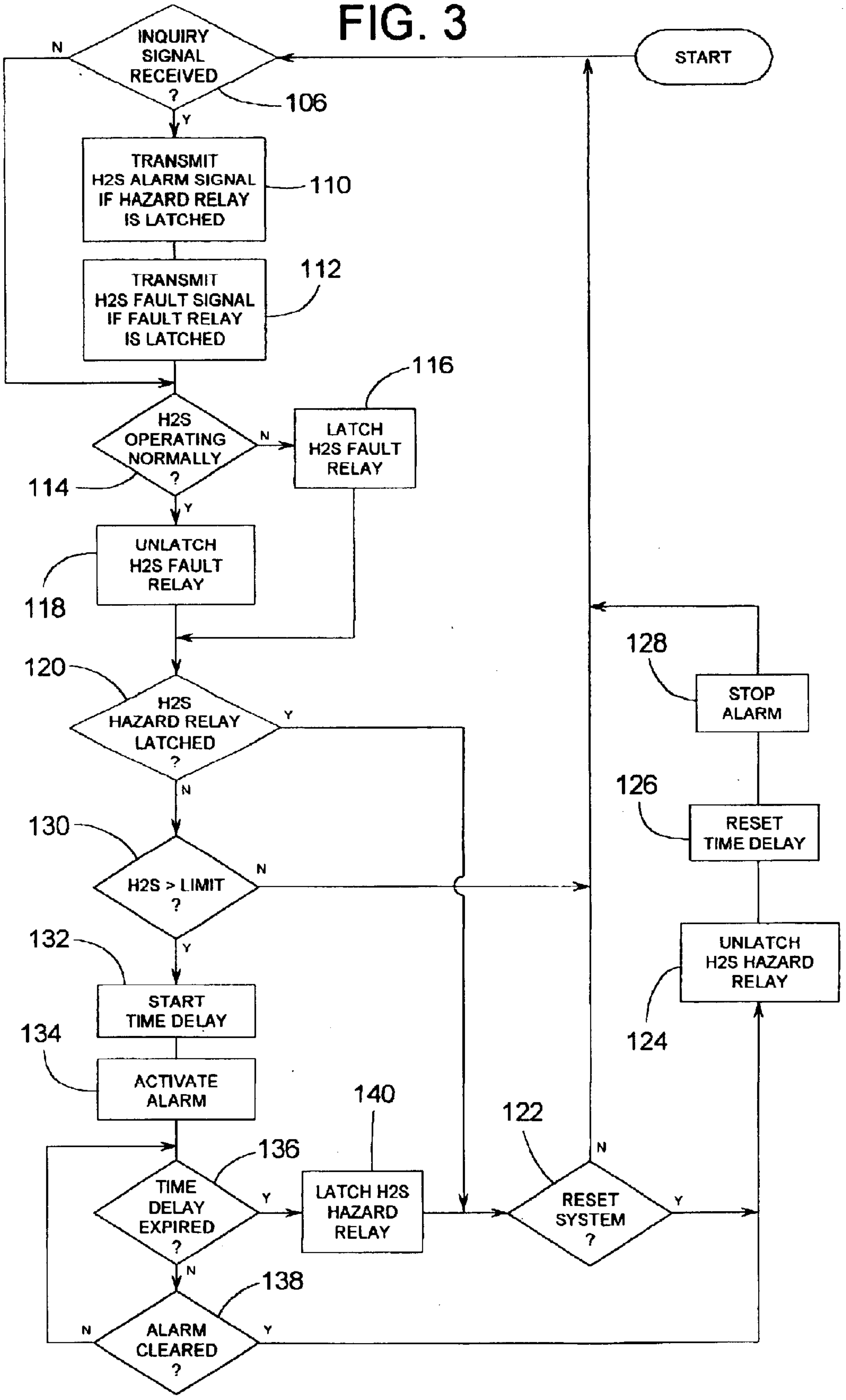
FIG. 3 is another example of an algorithm of a microcontroller that determines a system's response to a hazardous concentration of hydrogen sulfide gas.

In an alternate embodiment, controller 40 follows the logical sequence presented by the algorithm of FIG. 3. In this case, a decision block 106 determines whether host computer 52*a* has sent an inquiry signal 108 via communication link 50. If so, block 110 commands transmitter 32 to transmit H2S alarm signal 78 provided an H2S hazard relay has been latched. The H2S hazard relay is a conventional latch relay that is latched whenever H2S monitor senses that the concentration of H2S 58 exceeds the allowable limit. Similarly, block 112 commands transmitter 32 to transmit fault signal 46 if an H2S fault relay has been latched. The H2S fault relay is a conventional latch relay that is latched whenever controller 40 determines that a malfunction has occurred with H2S monitor 22. The malfunction could simply be the H2S monitor switching over to its backup power supply 26.

After block 112 or if inquiry signal 108 has not been received, the logic transfers to decision block 114. Block 114 determines whether a fault exists with H2S monitor 22. If so, block 116 latches the H2S fault relay. Otherwise, block 118 ensures that the fault relay is unlatched.

Next, decision block 120 determines whether the H2S hazard relay is latched. If latched, the logic transfers to a decision block 122, which determines whether system 10 is reset. If system 10 has not been reset, block 122 returns the logic to block 106. Otherwise, block 122 directs the logic to blocks 124, 126 and 128, which respectively unlatches the H2S hazard relay, resets a time delay, and stops alarm 28. After block 128, the logic returns to block 106.

Referring back to decision block 120, if the H2S hazard relay is not latched, a decision block 130 determines whether H2S monitor 22 detects a concentration of hydrogen sulfide that exceeds an allowable limit. If the hydrogen sulfide does not exceed the limit, the control logic returns to block 106.

If, however, the hydrogen sulfide does exceed the allowable limit, block 132 starts a time delay, and block 134 activates alarm 28. If no one resets alarm 28 within the allowed time delay as determined by blocks 136 and 138, then a block 140 latches the H2S hazard relay and returns the logic to decision block 122. If someone clears alarm 28 before the time delay expires, then the control logic returns to block 124. The process continues for as long as it is needed.

With the control algorithm of FIG. 3, host computer 52*a* knows the location of the alarm and fault activity because it is computer 52*a* that sends a unique inquiry signal 108 to each of the various well sites. In other words, computer 52*a* sends out one particular inquiry signal 108 to obtain the alarm and fault status of well site 12, and computer 52*a* sends out a different inquiry signal 108' to obtain the status of well site 16.

Although the invention is described with reference to a preferred embodiment, it should be appreciated by those skilled in the art that other variations are well within the scope of the invention. Therefore, the scope of the invention is to be determined by reference to the claims, which follow.

I claim:

1. A mobile system for responding to hydrogen sulfide at a plurality of well sites that are remote relative to a designated host computer, wherein the plurality of well sites includes a first well site and a second well site, comprising:

a mobile hydrogen sulfide monitor that is movable between the first well site and the second well site, wherein the mobile hydrogen sulfide monitor when at the first well site determines whether the hydrogen sulfide at the first well site exceeds an allowable limit, and wherein the mobile sulfide monitor when at the second well site determines whether the hydrogen sulfide at the second well site exceeds the allowable limit;

an alarm associated with the mobile hydrogen sulfide monitor, wherein the alarm is generated at the first well site in response to the mobile hydrogen sulfide monitor determining that the hydrogen sulfide at the first well site exceeds the allowable limit, and wherein the alarm is generated at the second well site in response to the mobile hydrogen sulfide monitor determining that the hydrogen sulfide at the second well site exceeds the allowable limit;

a mobile transmitter associated with the mobile hydrogen sulfide monitor and transmitting an alarm signal as a result of the mobile hydrogen sulfide monitor determining that the hydrogen sulfide exceeds the allowable limit;

a wireless communication link that conveys the alarm signal from the mobile transmitter to the designated host computer, a first location signal that identifies the location of the first well site, wherein the first location signal is communicated from first well site to the designated host computer when the mobile transmitter is at the first well site and the hydrogen sulfide exceeds the allowable limit; and a second location signal that identifies the location of the second well site, wherein the second location signal is communicated from second well site to the designated host computer when the mobile transmitter is at the second well site, whereby the designated host computer becomes informed of where the hydrogen sulfide has exceeded the allowable limit.

2. The mobile system of claim 1, further comprising an inquiry signal periodically conveyed from the designated host computer to the remote well site, wherein the alarm signal is inhibited from being conveyed to the designated host computer until the inquiry signal is conveyed to the remote well site.

3. The mobile system of claim 1, further comprising a time delay existing after the alarm is first generated, wherein the time delay provides an opportunity to deactivate the alarm before the time delay expires, wherein the alarm signal is conveyed after expiration of time delay provided the alarm has not been deactivated during the time delay.

4. The mobile system of claim 1, further comprising a global positioning system from which the first location signal and the second location signal are derived.

5. The mobile system of claim 1, further comprising an LBS system from which the first location signal and the second location signal are derived.

6. The mobile system of claim 1, further comprising a service vehicle that carries the mobile hydrogen sulfide monitor and the mobile transmitter, whereby the service vehicle provides mobility of the mobile hydrogen sulfide monitor and the mobile transmitter.

7. The mobile system of claim 1, a fault signal generated in response to a fault associated with the mobile hydrogen sulfide monitor, wherein the fault signal and at least one of the first location signal and the second location signal are communicated to the designated host computer, whereby the designated host computer becomes informed of where the mobile hydrogen sulfide monitor was when the fault occurred.

8. The mobile system of claim 1, further comprising:

a mobile NDB transmitter that can be relocated between the first well site and the second well site; and a radio signal generated by the NDB transmitter as a result of the hydrogen sulfide exceeding the allowable limit, whereby the radio signal serves as an electronic beacon that directs help to where the hydrogen sulfide has exceeded the allowable limit.

9. A mobile system for responding to hydrogen sulfide at a plurality of well sites that are remote relative to a designated host computer, wherein the plurality of well sites includes a first well site and a second well site, comprising:

a mobile hydrogen sulfide monitor that is movable between the first well site and the second well site, wherein the mobile hydrogen sulfide monitor when at the first well site determines whether the hydrogen sulfide at the first well site exceeds an allowable limit, and wherein the mobile sulfide monitor when at the second well site determines whether the hydrogen sulfide at the second well site exceeds the allowable limit;

an alarm associated with the mobile hydrogen sulfide monitor, wherein the alarm is generated at the first well site in response to the mobile hydrogen sulfide monitor determining that the hydrogen sulfide at the first well site exceeds the allowable limit, and wherein the alarm is generated at the second well site in response to the mobile hydrogen sulfide monitor determining that the hydrogen sulfide at the second well site exceeds the allowable limit;

a mobile transmitter associated with the mobile hydrogen sulfide monitor and transmitting an alarm signal to the designated host computer as a result of the mobile hydrogen sulfide monitor determining that the hydrogen sulfide exceeds the allowable limit;

a wireless communication link that conveys the alarm signal from the mobile transmitter to the designated host computer, a first location signal that identifies the location of the first well site, wherein the first location signal is communicated from first well site to the designated host computer when the mobile transmitter is at the first well site and the hydrogen sulfide exceeds the allowable limit at the first well site;

a second location signal that identifies the location of the second well site, wherein the second location signal is communicated from second well site to the designated host computer when the mobile transmitter is at the second well site and the hydrogen sulfide exceeds the allowable limit at the second well site, whereby the designated host computer becomes informed of where the hydrogen sulfide has exceeded the allowable limit; and a fault signal generated in response to a fault associated with the mobile hydrogen sulfide monitor, wherein the fault signal and at least one of the first location signal and the second location signal are communicated to the designated host computer, whereby the designated host computer becomes informed of where the mobile hydrogen sulfide monitor was at when the fault occurred.

10. The mobile system of claim 9, further comprising an inquiry signal periodically conveyed from the designated host computer to the remote well site, wherein the alarm signal is inhibited from being conveyed to the designated host computer until the inquiry signal is conveyed to the remote well site.

11. The mobile system of claim 9, further comprising a time delay existing after the alarm is first generated, wherein the time delay provides an opportunity to deactivate the alarm before the time delay expires, wherein the alarm signal is conveyed after expiration of time delay provided the alarm has not been deactivated during the time delay.

12. The mobile system of claim 9, further comprising a global positioning system from which the first location signal and the second location signal are derived.

13. The mobile system of claim 9, further comprising an LBS system from which the first location signal and the second location signal are derived.

14. The mobile system of claim 9, further comprising a service vehicle that carries the mobile hydrogen sulfide monitor and the mobile transmitter, whereby the service vehicle provides mobility of the mobile hydrogen sulfide monitor and the mobile transmitter.

15. The mobile system of claim 9, further comprising:

a mobile NDB transmitter that can be relocated between the first well site and the second well site; and a radio signal generated by the NDB transmitter as a result of the hydrogen sulfide exceeding the allowable limit, whereby the radio signal serves as an electronic beacon that directs help to where the hydrogen sulfide has exceeded the allowable limit.

16. A mobile system for responding to hydrogen sulfide at a plurality of well sites that are remote relative to a designated host computer, wherein the plurality of well sites includes a first well site and a second well site, comprising:

a mobile hydrogen sulfide monitor that is movable between the first well site and the second well site, wherein the mobile hydrogen sulfide monitor when at the first well site determines whether the hydrogen sulfide at the first well site exceeds an allowable limit, and wherein the mobile sulfide monitor when at the second well site determines whether the hydrogen sulfide at the second well site exceeds the allowable limit;

an alarm associated with the mobile hydrogen sulfide monitor, wherein the alarm is generated at the first well site in response to the mobile hydrogen sulfide monitor determining that the hydrogen sulfide at the first well site exceeds the allowable limit, and wherein the alarm is generated at the second well site in response to the mobile hydrogen sulfide monitor determining that the hydrogen sulfide at the second well site exceeds the allowable limit;

a mobile transmitter associated with the mobile hydrogen sulfide monitor and providing an alarm signal in response to the mobile hydrogen sulfide monitor determining that the hydrogen sulfide exceeds the allowable limit;

a wireless communication link that conveys the alarm signal from the mobile transmitter to the designated host computer, a first location signal that identifies the location of the first well site, wherein the first location signal is communicated from first well site to the designated host computer when the mobile transmitter is at the first well site and the hydrogen sulfide exceeds the allowable limit at the first well site;

a second location signal that identifies the location of the second well site, wherein the second location signal is communicated from second well site to the designated host computer when the mobile transmitter is at the second well site and the hydrogen sulfide exceeds the allowable limit at the second well site, whereby the designated host computer becomes informed of where the hydrogen sulfide has exceeded the allowable limit;

an acknowledgement signal conveyed from the designated host computer in response to the designated host computer receiving the alarm signal, wherein the acknowledgement signal is conveyed to the first well site if the alarm signal came therefrom, and the acknowledgement signal is conveyed to the second well site if the alarm signal came therefrom, wherein the acknowledgement signal indicates acknowledgement of the alarm signal being actually communicated to the designated host computer; and a reassurance signal generated in response to the acknowledgement signal being conveyed to at least one of the first well site and the second well site, wherein the reassurance signal is generated at the first well site if the acknowledgement signal was conveyed thereto, and the reassurance signal is generated at the second well site if the acknowledgement signal was conveyed thereto, wherein the reassurance signal signifies that help will be dispatched to where the hydrogen sulfide has exceeded the allowable limit.

17. The mobile system of claim 16, further comprising an inquiry signal periodically conveyed from the designated host computer to the remote well site, wherein the alarm signal is inhibited from being conveyed to the designated host computer until the inquiry signal is conveyed to the remote well site.

18. The mobile system of claim 16, further comprising a time delay existing after the alarm is first generated, wherein the time delay provides an opportunity to deactivate the alarm before the time delay expires, wherein the alarm signal is conveyed after expiration of time delay provided the alarm has not been deactivated during the time delay.

19. The mobile system of claim 16, further comprising a global positioning system from which the first location signal and the second location signal are derived.

20. The mobile system of claim 16, further comprising an LBS system from which the first location signal and the second location signal are derived.

21. The mobile system of claim 16, further comprising a service vehicle that carries the mobile hydrogen sulfide monitor and the mobile transmitter, whereby the service vehicle provides mobility of the mobile hydrogen sulfide monitor and the mobile transmitter.

22. The mobile system of claim 16, a fault signal generated in response to a fault associated with the mobile hydrogen sulfide monitor, wherein the fault signal and at least one of the first location signal and the second location signal are communicated to the designated host computer, whereby the designated host computer becomes informed of where the mobile hydrogen sulfide monitor was when the fault occurred.

23. The mobile system of claim 16, further comprising:

a mobile NDB transmitter that can be relocated between the first well site and the second well site; and a radio signal generated by the NDB transmitter as a result of the hydrogen sulfide exceeding the allowable limit, whereby the radio signal serves as an electronic beacon that directs help to where the hydrogen sulfide has exceeded the allowable limit.

* * * * *